United States Patent
Merkel

Patent Number: 6,117,376
Date of Patent: Sep. 12, 2000

[54] METHOD OF MAKING FOAM-FILLED COMPOSITE PRODUCTS

[76] Inventor: Michael Merkel, 22451 Overlake Dr., Lake Forest, Calif. 92630

[21] Appl. No.: 08/987,533

[22] Filed: Dec. 9, 1997

Related U.S. Application Data

[60] Provisional application No. 60/032,939, Dec. 9, 1996.

[51] Int. Cl.$^7$ .................... B29C 44/06; B29C 44/12
[52] U.S. Cl. .............. 264/46.5; 264/46.6; 264/46.7; 264/257; 264/338
[58] Field of Search ................. 264/258, 46.5, 264/46.6, 46.7, 338, 257

[56] References Cited

U.S. PATENT DOCUMENTS

| | | | |
|---|---|---|---|
| 3,940,468 | 2/1976 | Tunstall | 264/46.6 |
| 4,119,583 | 10/1978 | Filip et al. | 264/46.5 |
| 4,614,627 | 9/1986 | Curtis et al. | 264/46.6 |
| 4,714,575 | 12/1987 | Preston | 264/46.4 |
| 4,863,771 | 9/1989 | Freeman | 264/257 |
| 5,173,227 | 12/1992 | Ewen et al. | 264/46.6 |
| 5,245,770 | 9/1993 | Ko et al. | 264/46.5 |
| 5,501,825 | 3/1996 | Jodelet | 264/46.5 |
| 5,580,502 | 12/1996 | Forster et al. | 264/46.5 |
| 5,683,636 | 11/1997 | van der Spek et al. | 264/46.7 |
| 5,897,818 | 4/1999 | Lewit et al. | 264/46.5 |

*Primary Examiner*—Allan R. Kuhns
*Attorney, Agent, or Firm*—Merchant & Gould P.C.

[57] ABSTRACT

A method for making foam-filled parts having fiber-reinforced skins or surfaces is disclosed. Mold halves of pressure-resisting thermally insulative material are covered with a release material, which is then covered with the fiber skins. The fiber skins are coated with heat-curable resin, and the mold halves are then clamped together to form a cavity. A catalyzed foam-forming mixture is poured into the cavity. The mixture foams and expands to the full volume of the cavity, and while it hardens generates heat sufficient to cure the resin.

8 Claims, 4 Drawing Sheets

METHOD OF MAKING FOAM-FILLED COMPOSITE PRODUCTS

CROSS-REFERENCE TO RELATED APPLICATIONS

This invention relates to Provisional application Ser. No. 60/032,939, filed Dec. 9, 1996. The contents of that application are incorporated by reference herein.

BACKGROUND OF THE INVENTION

Synthetic composites are increasingly being used in making products for a number of different reasons. Synthetic materials are often easier to mold or otherwise fabricate into parts than other materials, and products can usually be replicated in large volume at lower cost. Additionally, synthetic materials have strength/weight ratio advantages, and require lower capital costs or initial investment. Fiber reinforced resin products now exist in wide ranging and growing variety, whether the fibers are glass, carbon, graphite, boron or of polymeric material. An important division within this broad category is that of foam-filled parts having a skin of reinforced fiber material. While foam-filled synthetic structures which have inner and outer synthetic shells that are not fiber reinforced are also well-known, fiber or filament reinforcement is demanded where greater strength and stiffness are of importance.

Important examples of the usefulness of foam-filled reinforced fiber skin parts are found in aerodynamic applications, such as front and rear wings for racing vehicles and empennage and control surfaces for aircraft. These require a high strength to weight ratio, precise conformity to shape under significant force loading, and also high impact resistance. The high velocities at which these vehicles travel mean that an impact to an aerodynamic surface which does not materially damage the remainder of the vehicle can itself have catastrophic results. Minor collisions or contacts should not result in deformation of such a component, since shape change would reduce its utility.

While some parts of this type might be made in high volume, such as a shaped wing for a production sports car, there are a number of situations in which an ability to fabricate a small number of parts without incurring high capital costs is required or desirable. For example, as racing vehicles evolve through a sequence of changes to meet competition, wing designs can change as well. Production runs of each variant may thus be quite limited. Consequently, racing teams will not keep on hand a significant inventory of such parts, forcing them to replicate a destroyed or damaged part at low cost, if possible, from an existing unit. This is seldom feasible using present day technology, particularly if such work must be done at a racing venue.

Similarly, needs exist for making airfoil structures using new methodologies in the private airplane business. Using any of a large number of available kits, private airplane enthusiasts can build their own craft and fly them without the stringent testing and certification procedures needed for production aircraft. Even with certified production aircraft, which have long life expectancy, but which may no longer be manufactured in the same model, replacement of aerodynamic parts may require replication from an existing unit. Few suppliers will tool up to manufacture one or only a few units, even though the user must of necessity pay a significant price. The ability to duplicate at low capital and process cost from an available part is thus of real significance in this field as well.

The physical integrity of a foam filled, fiber-reinforced skin part is dependent on the nature of the union between the different materials, as well as the thickness, strength and stiffness of the fiber-reinforced composite layers themselves. With superior physical properties being achievable, parts can be redesigned to take advantage of such characteristics.

SUMMARY OF THE INVENTION

A method for making foam-filled parts having fiber reinforced skins or surfaces is described that is amenable for use with small or large production lots. Capital requirements and manufacturing costs are low, and no process steps are so critical as to introduce a yield or reliability problem. The products thus made have advantageous physical properties, because the foam interior is physically and chemically united with the fiber reinforced skin.

The method utilizes unique mold halves which are constructed so as to form a pressure-confinement vessel with a shaped interior mold cavity that is non-adhesive to polymeric materials and is surrounded by pressure-resisting thermally insulative material. The mold halves include strong inner and outer walls having peripheral flanges which can be clamped together. Fiber layers are built up on the two mold halves, using any preferred fiber orientations and using the number of layers desired. Once laid up, the layers are thoroughly wetted with a heat-curable resin system to adhere to the mold walls. The mold halves are placed together, clamped at their flange peripheries, and at least one end is sealed with a malleable material. The mold thus forms an open-ended cavity which is placed upright on the sealed end. A foam-forming resin system, mixed on-site, is premeasured so as to more than fill the cavity and poured into the open end of the mold cavity. The mix begins foaming after a short delay, generating an exothermic reaction that heats the wetted skins above the cure level. The interior of the mold is thus fully filled, pressurized and heated, but the expansion time is short as the foam mix solidifies quickly. The excess foam extruded out the ends of the mold before solidification assures that the interior is filled and the expansion has exerted lateral pressure within the mold. Heat in the skins generated by the exothermic reaction initiates and maintains curing of the wet resin because the thermal energy is largely retained within the mold. The internal pressurization is of a level which assures physical contact between the foam and the skin, and the layers in the skin. A post-curing interval can be employed to assure full stabilization of the composite product. Thereafter, upon release of the clamps, the product is readily released from the mold and almost immediately available for use.

The process and product are particularly amenable to the manufacture of air foil-type parts because of the strength, impact resistance and freedom from delamination under high speed conditions that is attained. In addition, the process allows the interior of the part itself to be configured to receive an interior structure such as a fuel tank, a shaft or a tube.

Because the mold halves have strong pressure resistant outer walls, but only the interior portions need have precise, part forming shapes, the outer walls can be reused for different but somewhat similar applications. Virtually no capital equipment is required for the manufacture of molds or parts in small or large quantities. No external power is required to generate heat or pressure. In consequence, typical parts, such as racing wings for a vehicle, can be manufactured on site, as at a racing venue, with minimal equipment and investment.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 5:
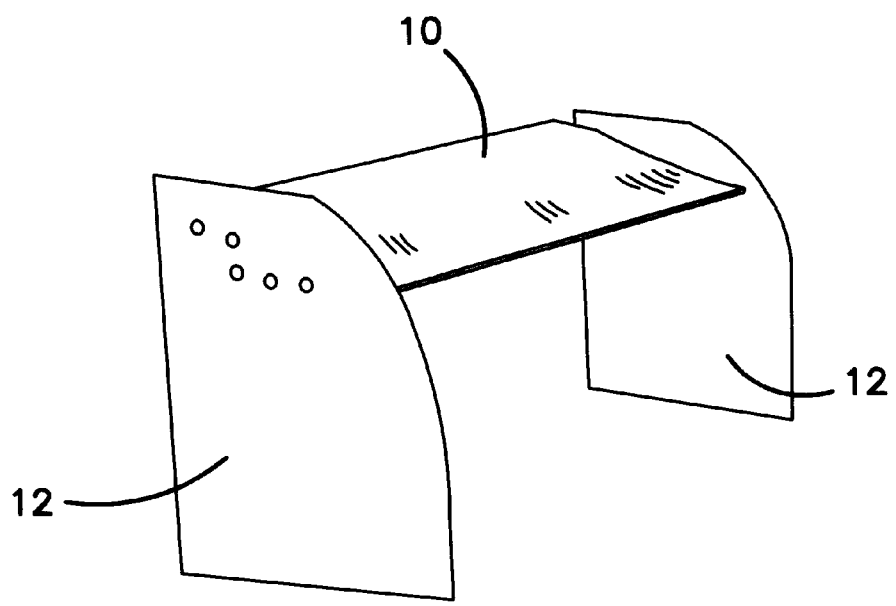
FIG. 5 is a perspective partial view of a completed rear wing product made in accordance with the method of FIGS. 1–4.
Figure 6:
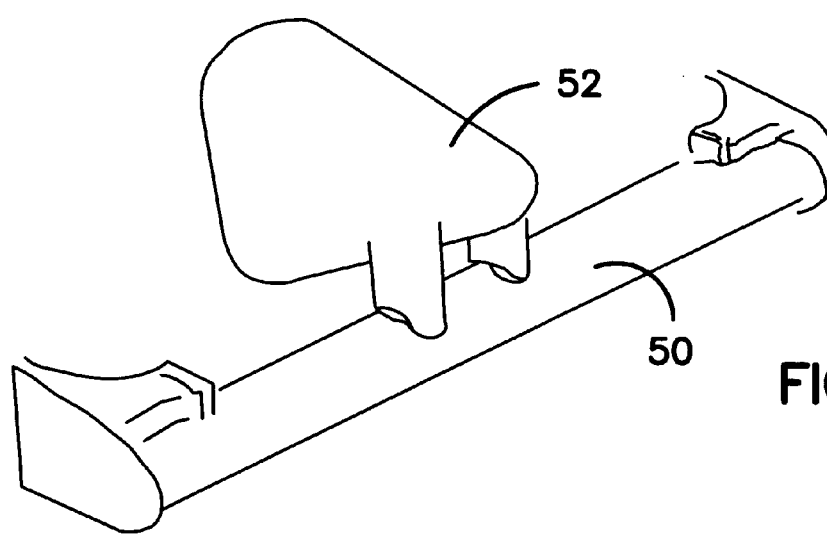
FIG. 6 is a perspective partial view of a front wing product made in accordance with the invention.

Referring briefly first to the product depicted in FIG. 5 for a frame of reference, a rear wing 10 is shown as it would be mounted on a racing vehicle (not shown) between a pair of upstanding, streamlined supports 12. The wing 10 has an aerodynamic cross-section, curved to provide downward force (i.e., negative lift) so as to enhance traction when most needed, at high speed. Front wings as discussed in conjunction with FIG. 6 are also used and are subject to damage from contact with debris, stationary objects or other vehicles. The objective with such wings is to maintain optimum aerodynamic characteristics under normal driving conditions, unaffected by normal wear and tear, but with a structure which has an appropriate strength to weight ratio. Relatively minor impacts and occurrences can destroy the aerodynamic properties of conventional aluminum wings, and can cause delamination of some wings made of composite materials. If such incidents happen at speed, the results can be catastrophic.

Figure 1:
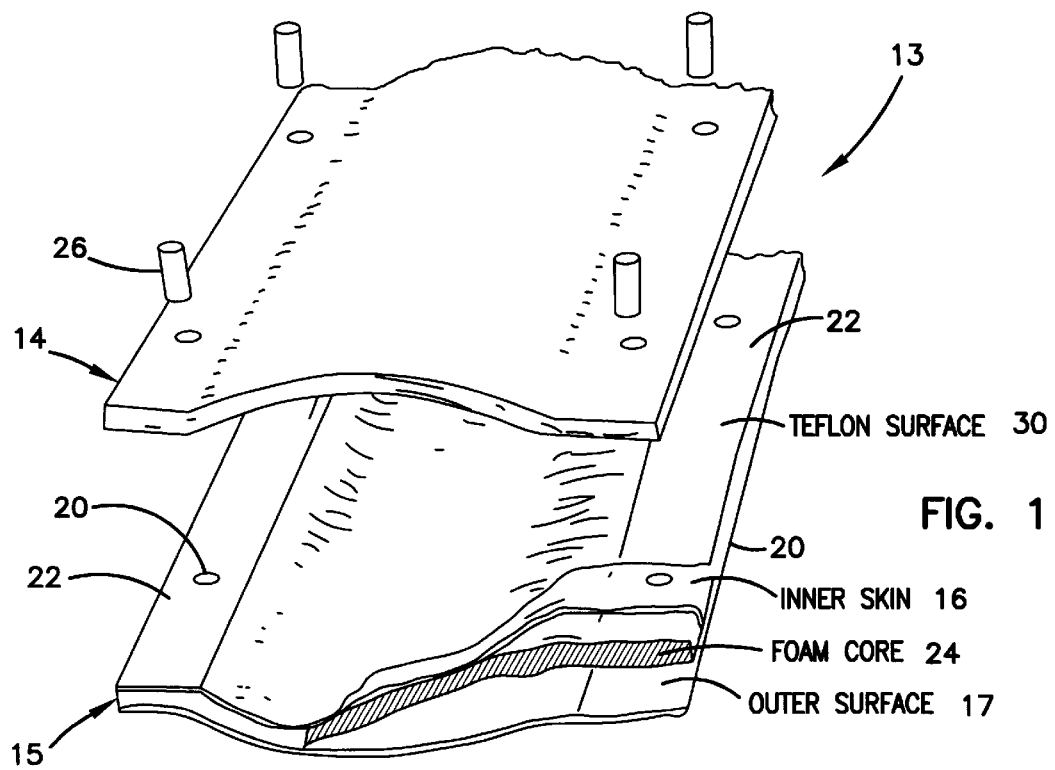
FIG. 1 is a side sectional view of mold halves for making a racing wing in methods in accordance with the invention.

To prepare a mold 13 for use in a process in accordance with the invention, referring now to FIG. 1, a master or plug may be made of metal, wood or other conventional prototype materials, or a previously fabricated part, such as an aluminum racing wing, can itself be used. The mold 13 is fabricated, as shown in FIG. 1, in separate halves 14, 15 which can be mirror images of each other, except as to surface shape, so that only one need be described. The two mold halves 14, 15 can be made by conventional techniques or, with modifications, by employing the molding process of the present invention. Each mold comprises carbon reinforced outer layers or skins, the carbon fibers usually being in fabric form, and the skins being approximately 0.100" thick. The inner skin 16 is joined to the outer carbon fabric skin 17, also of about 0.100" thick, at fabric sidewalls 20 around the periphery of the respective half mold. It will be appreciated that these examples of thicknesses and fiber orientations merely demonstrate what will suffice for providing strength and shape characteristics in the present example, but that other variants may be used. The mold halves 14, 15 each include side flanges 22 along each longitudinal side (i.e., the leading and trailing edges of the air foil), the facing surfaces of the flanges 22 being shaped to lie flush together when the two halves 14, 15 are assembled into the mold body.

To form the mold halves 14, 15, the part serving as a master, or the shaped replica, is first covered with a release agent (not shown). The inner and outer skins 16, 17 respectively and a foam core 24 between the skins 16, 17 are then laid up as a laminate, the skins 16, 17 having been preimpregnated with a B-stage resin. The entire laminated assembly is molded at temperature under pressure until fully cured, with the flanges of the two halves being prevented from adhering by "Teflon™" strips or other release means. This conventional procedure may be used when the mold is being prefabricated for later production runs, using typical equipment. At a racing venue, however, an autoclaving or other conventional molding unit may not be available, so that it may be preferable to utilize the process of the present invention, which requires no heat, pressure, or vacuum. If this is done, the only part needed to start is an outer skin or plate, prefabricated with selected strength and thermal insulation characteristics. It should have side flanges but its curvature need not be precise since the foam interior will automatically fill any gap relative to the inner surface. This will be understood better in terms of the manner in which a composite part is formed, described below.

Each mold half of inner and outer skins 16, 17 and foam core 24 has in this example a thickness of about 1.00" and is a rigid structure having substantial thermal insulating characteristics.

After the solid mold halves 14, 15 are completed, positioning pins 26, at least three in total number, are mountable in precisely aligned positioning holes 28 in the side flanges 22 of the two halves. Thus, the mold halves 14, 15 can be placed into exact registration and maintained in that position during completion of the process. Prior to the start of the manufacture of the airfoil structure, the active surfaces (essentially the concavities) in the mold halves 14, 15 are covered with a commercial Teflon™ sheet 30 having an adhesive backing, and sold by AIRTECH Int. as part number A007.(005) or (012). This material adheres to the mold face through numerous replications of parts and freely releases from polymers that are cured in direct contact with its surface. This approach also has the advantage of avoiding contamination of the resin surface with the release agent, such as wax-based materials.

Figure 2:
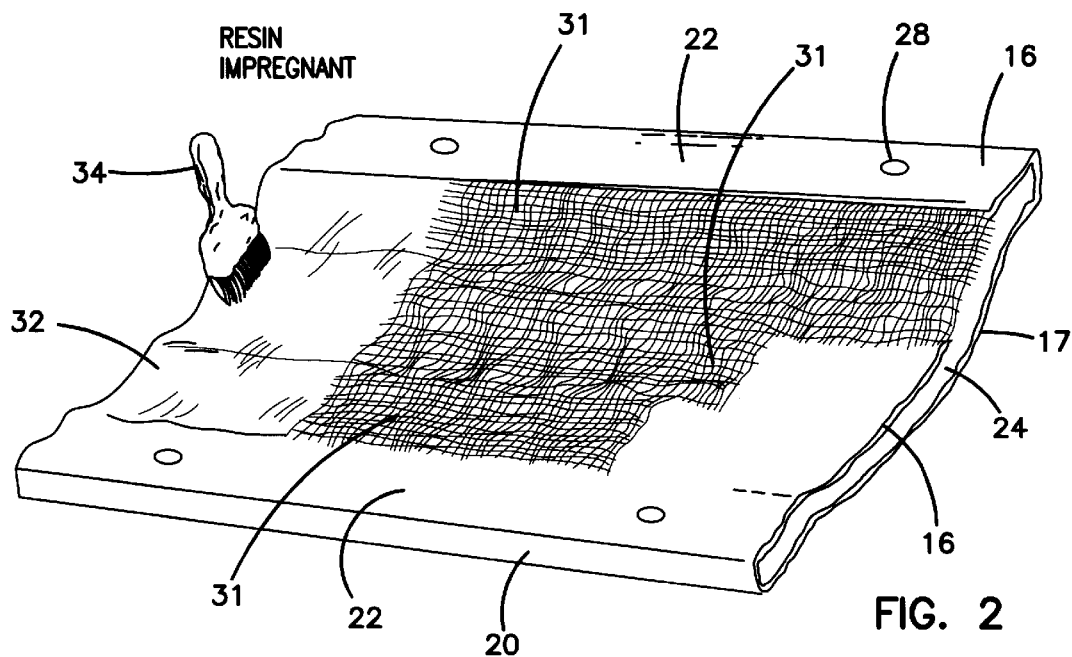
FIG. 2 is a perspective view, partially broken away, of the lay-up of reinforcing fibers on a mold half formed according to FIG. 1.

As seen in FIG. 2, the mold halves 14, 15 are then disposed with their concave inner skins 16 facing upwardly, and dry (i.e., unimpregnated) fiber-reinforced skin material is laid in to cover the entire concavity surface. In the present example, the carbon fiber skins are in loosely woven sheet or strip form 31, having sufficient cross weave fibers to permit easy handling without separating. A suitable example is a bi-directional plain weave of 6K tow with 0.007 inch fibers, sold as Style No. 716 by Aircraft Spruce Co. of Fullerton, Calif. With a given thickness of skin, the fibers can be laid up with orientations selected to enhance resistance to bending, twisting, compression or other expected force loading. Since the carbon or graphite fibers are the most expensive component of the system, achieving desired properties without utilizing excessive skin material is of obvious importance. Examples of other skin materials that have been successfully employed include (all carbon fibers) unidirectional, harness and twill weaves with fibers of from 0.006" to 0.013" and from 2K to 8K tow. Different weaves have been used for different layers, based not only on physical properties but significantly on cost.

With the carbon fiber lengths 31 laid up to a selected thickness, and fully covering the concave parts of the mold 14 or 15, the fibers are then (as seen in FIG. 2) thoroughly wetted or impregnated in place with an uncured resin 32, such as an epoxy resin from West, sold as system 105 resin with 205 or 206 hardener. The hardener is a thermally activated catalyst that requires a long-term curing at ambient temperature, although it acts quickly above a threshold, so that it remains wet or "green" until the proper time in the ensuing process. A brush 34 is suitable for rapid application of the resin impregnant 32.

Figure 3:
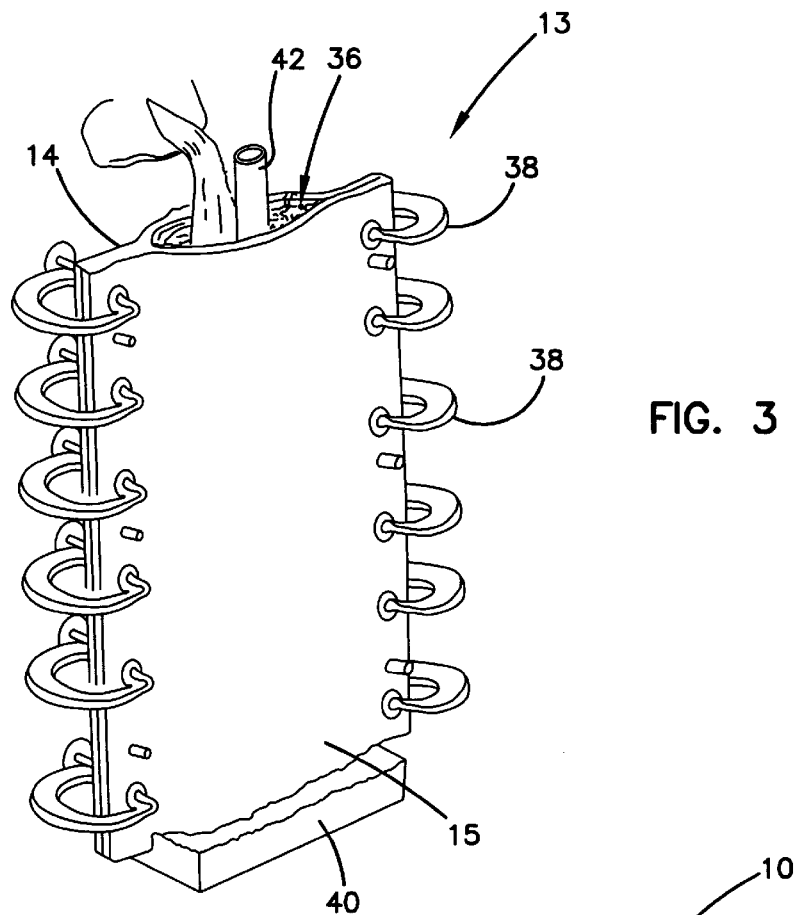
FIG. 3 is a perspective view, partially broken away, of a united and clamped mold system forming an interior mold cavity used in a method in accordance with the invention.
Figure 4:
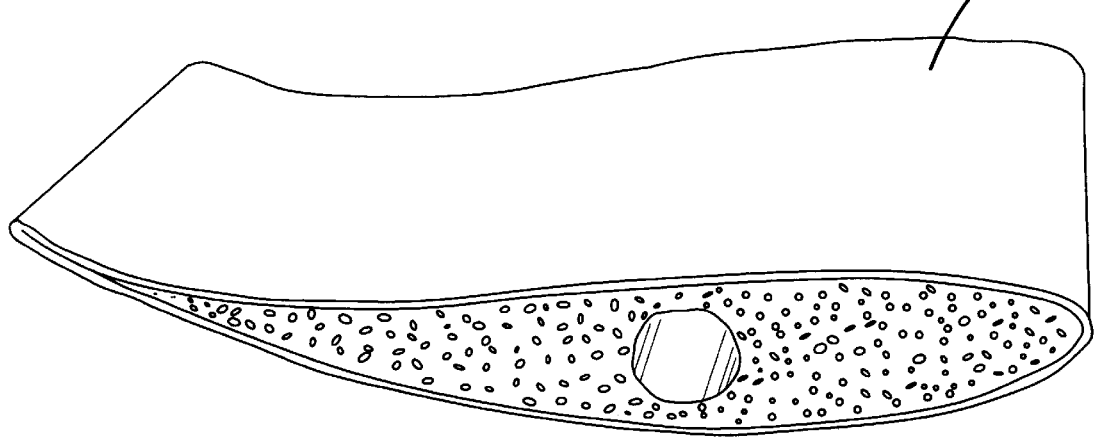
FIG. 4 is a side view of a molded wing showing interior details thereof.

The resin system causes the fiber reinforcement to adhere tightly to the inner surfaces of the concavity in the mold 13, despite the Teflon™ covered surface 30. Excess material is included at the ends of the molds 14, 15, since the excess may be trimmed off, but the fibers are not allowed to extend into the flanges 22 to an extent such as to interfere with closure of the mold. With the two mold halves 14, 15 prepared in this manner, they can be placed together, with the positioning holes 28 in alignment, and the positioning pins 26 inserted. The flange 22 faces being in intimate contact, an interior cavity 36 (see FIG. 3) is defined between the concave faces, and C-clamps 38 are then placed about the periphery of the flanges and tightened. The mold unit 13 thus forms what may be regarded as a pressure vessel. In addition, a malleable seal 40 is placed across one end of the mold cavity 36, being quickly worked by hand into engagement with the mold halves 14, 15. The seal 40 here is of a commercial oil-based modeling clay, since this is inexpensive and adequately resists internal pressure build-up. In practice, such modeling clay may open into small apertures which allow extrusion of foam, but the foam expansion is quickly self-terminating and the clay may also be reshaped so as to close off any openings so formed.

When the mold halves 14, 15 are still open, as seen in FIG. 2, a tube 42 or other insert (seen only in FIG. 3) may be placed within the concavity, either to be embedded permanently or to be removed for insertion of a separate part. In this example, the tube 42 provides a hole in which a lateral mount shaft (not shown) for the formed wing can be inserted. Alternatively, one or more reinforcing struts, a fuel cell, or other structures may be inserted, symmetrically or asymmetrically, into the cavity to be defined between the mold halves 14, 15.

Referring again to FIG. 3, when the two mold halves 14, 15 are clamped together in opposition, with the flanges 22 in engagement, and with the holes 28 aligned by the positioning pins, the C-clamps 38 are tightened sufficiently on the flanges to prevent leakage of foam material out the sides. The mold cavity 36 is thus sealed on three sides, and can be placed in a substantially vertical position so that a premixed foamable liquid can be poured in immediately after preparation. This mix may be of the type such as Polytech 20/08-, and will include the desired proper amount of catalyst for the volume of resin and the cavity. This material expands to about 40 times its original volume. The setup procedure of joining, clamping and sealing requires only a few minutes at most after wetting of the carbon skins, so that the epoxy impregnant remains in completely uncured condition at this point. The foamable liquid mix rapidly begins to expand and build up interior pressure within the mold cavity 36 (within less than one minute) after being poured. The reaction is strongly exothermic, and heats the foam to in excess of 300° F. as it expands under significant local pressure everywhere in the mold cavity 36. The heat is conducted into the skin layers throughout. A property of this mixture, however, is that the expansion is self-limiting, in that while significant pressure is generated during expansion, total expansion is limited by the rapid hardening characteristic of the material. Consequently, while the predetermined volume of mix is such that material foams out of the top of the mold cavity 36, and may even leak through the malleable seal 40 to a limited extent, the interior of the mold cavity is uniformly pressurized and there are no voids. The heat generated by the exotherm raises the temperature of the wet resin matrix at the skin above the curing level. A high temperature level is also maintained for many more minutes by the insulative characteristic of the mold halves 14, 15. The close physical, pressurized contact between the foam and the skin resin system not only cures the skins into true fiber-reinforced composites, but assures chemical adherence at the interface between the foam and the skin on all surfaces.

To complete the finished part, it is usually left in the mold for a post-cure interval, the length of which depends on ambient temperature but will typically be one to two hours. After that interval, the C-clamps 38 are released and the mold is readily separated from the part. The opposite ends can be trimmed off to the desired dimension, the inserted tube 42 removed to enable insertion of a mount tube and the leading and trailing edges of the structure can be trimmed of small fiber ends or flashing.

It will be evident to those skilled in the art that in a production process the fiber reinforcing layers can comprise precut panels, the uncured resin may be applied by spray, roller or other automated means, and that the edge clamping can be achieved automatically by mechanical or hydraulic systems.

Nonetheless, in the process described, the total amount of processing time, apart from the post-cure interval, is less than about 20 minutes when done by hand, as described. With no need for generation of high temperature, high pressure or a high vacuum level, the entire process, starting with a prefabricated mold, can be done with minimal equipment and without site preparation.

The wing 10 shown in FIG. 5 has remarkable physical properties, achieved at low cost by comparison to other composite structures of the same kind. The same is true of the front wing 50, shown in FIG. 6 as attached to the nose cone 52 for a vehicle. The strength imparted by the fiber-reinforced skins is materially enhanced by the intimate physical bonding of the interior foam core to the skins so that the unit has a high stiffness and also high impact resistance. This means that at high speed, the airfoil retains its shape without compression or twisting, but at the same time has minimal deformation but high shatter-resistance. The layers of the skins are so intimately bonded within the matrix material that interface problems and tendencies to delaminate are virtually absent.

Figure 7:
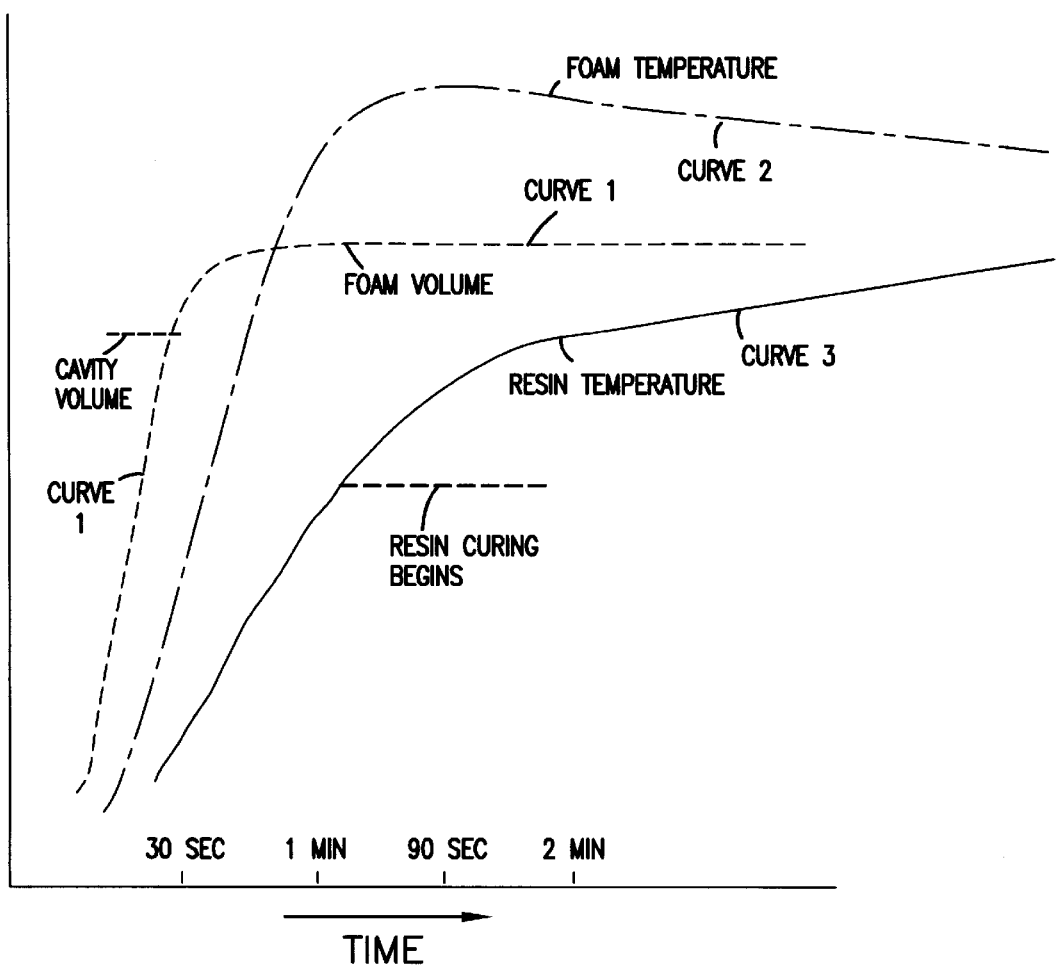
FIG. 7 is a graphical depiction of variations with time of temperature and volume during expansion of the foam within the mold cavity in the process of FIGS. 1–4.

Several time and transition relationships in the molding and fusing steps are depicted in FIG. 7, to enable better appreciation of how the united structure is formed. Shortly after being poured in, the foamable mix expands (curve 1), fills and somewhat overflows the mold cavity. Interior contact of the form with the skins, and pressurization of foam against the skin, are complete before overflow. The self-limiting nature of the expansion means that the foam volume remains constant at a peak value thereafter. The temperature of the foam rises rapidly (curve 2) to a maximum reached after full expansion, and thermal transfer to the resin impregnant in the skins (curve 3) is delayed slightly but the cure level is quickly exceeded, beginning the cure. With the high temperature being maintained, the temperature difference is gradually decreased with time until the foam and skins have the same temperature. They then cool together toward the ambient level during the post-cure period (not shown). The crucial structural and chemical interactions all are effected within the first two minutes.

What is claimed:

1. A method of forming a volumetric part having a pair of fiber-reinforced resin skins about a solid foam interior body, using a pair of mold halves defining the outside configuration of the body, the method comprising the steps of:

laying dry fiber skins in the mold halves to provide skins having substantially coextensive edges along at least two sides;

wetting the skins with heat curable resin;

joining the mold halves together along the coextensive edges to provide an interior volume sealed except for an access aperture;

inserting catalyzed foamable exothermic material into the interior volume through the access aperture after wetting the skins with heat curable resin in an amount that is sufficient to overfill the entire interior volume when foamed;

allowing the exotherm from the foaming to activate and cure the resin for a time sufficient to unite the foamed body to the resin of the skin while exerting expansive force thereon; and separating the molds from the cured resin skins.

2. A method as set forth in claim 1 above, wherein the mold halves define concavities having substantially parallel side flanges and further including the steps of:

covering the concavities with release material before laying in the dry fiber skins;

plugging one open end of the joined molds before inserting foamable material; and clamping the molds together along the side flanges to resist pressure buildup.

3. A method as set forth in claim 1 above including the steps of providing sufficient structural reinforcement for the mold halves to resist significant deflection from pressure buildup and sufficient insulation to retain exothermic heat for the desired interval.

4. A method as set forth in claim 2 above, wherein the plugging of one open end comprises inserting a malleable removable material, and the method further includes the steps of placing the access aperture in an elevated position and pouring the foamable material into the interior volume.

5. A method as set forth in claim 1 above, wherein the volumetric part comprises an airfoil, and wherein the method includes raising the exotherm level to above about 300° F., and further includes the steps of curing the structure for in excess of about one hour, and inserting a release material in the form of sheets against the concavity walls.

6. A method as set forth in claim 1 above, wherein the fiber skins are made of bi-directional plain weave carbon fibers, the resin impregnant is an epoxy resin, the catalyst is thermally activated, and the method further includes the step of precisely positioning the mold halves relative to each other by positioning pins inserted in positioning holes in the side flanges.

7. A method as set forth in claim 1 above, further including placing a removable part within the interior volume of the joined molds prior to inserting the catalyzed exothermic material, and removing said part after curing of the material to form a cavity in the material for insertion of a permanent part.

8. A method as set forth in claim 1 above, further including placing a permanent part within the interior volume of the joined molds prior to inserting the catalyzed exothermic material.

* * * * *